No. 841,505. PATENTED JAN. 15, 1907.
F. M. GEORGI.
VEHICLE TIRE.
APPLICATION FILED MAY 25, 1906.

UNITED STATES PATENT OFFICE.

FRIEDRICH M. GEORGI, OF CHICAGO, ILLINOIS.

VEHICLE-TIRE.

No. 841,505.  Specification of Letters Patent.  Patented Jan. 15, 1907.

Application filed May 25, 1906. Serial No. 318,641.

*To all whom it may concern:*

Be it known that I, FRIEDRICH M. GEORGI, a citizen of the United States, residing at Chicago, in the county of Cook and State of Illinois, have invented certain new and useful Improvements in Vehicle-Tires; and I do hereby declare the following to be a full, clear, and exact description of the invention, such as will enable others skilled in the art to which it appertains to make and use the same.

My invention relates to a novel construction in an elastic core for tires, the object being to provide cushioning means to take the place of air in pneumatic tires, so as to render the latter serviceable whether punctured or not; and it consists in the features of construction and material employed, hereinafter fully described and claimed.

Figure 1:
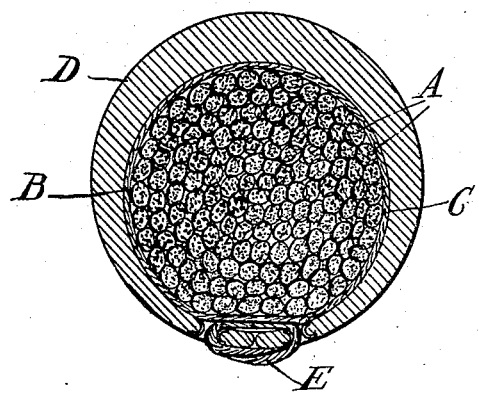
Figure 2:
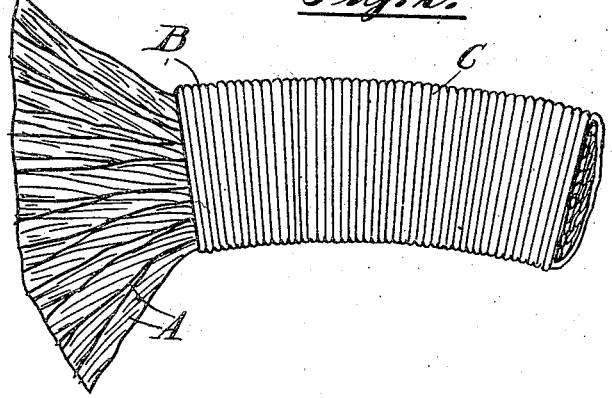
Figure 3:

In the accompanying drawings, illustrating my invention, Figure 1 is a transverse section of a tire provided with a core constructed in accordance with my invention. Fig. 2 is a fragmentary view in elevation of the core. Fig. 3 is a detail fragmentary view in elevation of one of the strands disposed in the core.

My said invention, as previously stated, is designed principally as a light flexible relatively indestructible core, intended particularly for pneumatic tires to take the place of compressed air, the object being to provide means whereby the tire may be used continuously, whether punctured or not, and from which the core may be removed and transferred to another tire when the first tire is worn out.

My invention consists primarily in the employment of a material which is very elastic and which retains its elasticity indefinitely and practically under all conditions. I have found wool to be most satisfactory for this purpose provided that long very loosely-twisted fibers are employed. In Fig. 3, at A, I have shown a strand of long loosely-twisted wool suitable for my purpose.

The core B consists of a large number of said strands A, laid in contact with each other and compressed by means of the cord C, wound tightly around the total number or body of said strands A, spirally in close contact in substantially the same manner that thread is wound upon a spool. The said strands A are thus compressed tightly against each other, and in this manner the core of any desired diameter and stiffness may be easily produced. The said core is then introduced into a tire D, the latter being preferably constructed so as to be open diametrically opposite the tread thereof and there laced together after the core has been introduced in order to stretch said tire tightly over said core. At E, Fig. 1, I have indicated such lacing; but obviously any other means for maintaining said tire stretched over said core may be employed. A core thus constructed has a great deal of elasticity and will assume its original shape after compression almost as readily as rubber, but has the advantage of being exceedingly light as compared with rubber, and therefore affording an excellent substitute for the latter in the tire. It will be obvious that said tire may be punctured in innumerable places in travel without materially affecting its traveling power.

My invention also has the advantage of being relatively cheap, and by reason of the practical indestructibility of the material employed the same may be used over and over again, thereby making it very economical and desirable.

I claim as my invention—

1. A core for elastic vehicle-tires, comprising a plurality of loosely-twisted strands of wool surrounded by and compressed within a covering of cord wound about said strands.

2. A core for hollow elastic vehicle-tires, comprising a plurality of thick, loosely-twisted strands of wool disposed practically parallel with each other, all of said strands being compressed within a covering.

3. A core for hollow elastic vehicle-tires, comprising a plurality of thick, loosely-twisted strands of wool disposed practically parallel with each other, all of said strands being compresed within a covering, consisting of cord wound spirally tightly around said strands.

In testimony whereof I have signed my name in presence of two subscribing witnesses.

FRIEDRICH M. GEORGI.

Witnesses:
 RUDOLPH WM. LOTZ,
 E. F. WILSON.